US006792599B2

(12) United States Patent
Poulsen et al.

(10) Patent No.: US 6,792,599 B2
(45) Date of Patent: Sep. 14, 2004

(54) METHOD AND APPARATUS FOR AN ATOMIC OPERATION IN A PARALLEL COMPUTING ENVIRONMENT

(75) Inventors: David K. Poulsen, Champaign, IL (US); Sanjiv M. Shah, Champaign, IL (US); Paul M. Petersen, Champaign, IL (US); Grant E. Haab, Mahomet, IL (US)

(73) Assignee: Intel Corporation, Santa Clara, CA (US)

( * ) Notice: Subject to any disclaimer, the term of this patent is extended or adjusted under 35 U.S.C. 154(b) by 557 days.

(21) Appl. No.: 09/977,798

(22) Filed: Oct. 15, 2001

(65) Prior Publication Data

US 2003/0074649 A1 Apr. 17, 2003

(51) Int. Cl.[7] ................................................. G06F 9/45
(52) U.S. Cl. ....................................... 717/136; 717/149
(58) Field of Search ................................ 717/136–161; 711/133, 170–173; 709/213–216, 400

(56) References Cited

U.S. PATENT DOCUMENTS

| | | | | |
|---|---|---|---|---|
| 5,627,992 A | * | 5/1997 | Baror ........................ | 711/133 |
| 5,717,883 A | * | 2/1998 | Sager ........................ | 717/149 |
| 6,029,212 A | * | 2/2000 | Kessler et al. .............. | 709/213 |
| 6,704,925 B1 | * | 3/2004 | Bugnion ..................... | 717/138 |
| 6,721,944 B2 | * | 4/2004 | Chaudhry et al. .......... | 717/154 |

OTHER PUBLICATIONS

Dwarkadas et al. An Intergrated Compile–Time/Run–Time Software Distributed Shared Memory System. ACM. 1996. pp. 186–197.*
Pande et al. Compiling Functional Parallelism on Distributed–Memory Systems. IEEE. 1994. pp. 64–76.*
Li et al. Program Analysis and Transformation for Fast Data Sharing. IEEE. 1994. pp. 131–138.*
Cooper et al. The ParaScope Parallel Programming Environment. IEEE. 1993. pp. 244–263.*
OpenMP C and C ++ Application Program Interface Version 1.0, Open MP Document Review Board, Document No. 004–2229–001, Oct. 1998, 82 pages.

* cited by examiner

Primary Examiner—Wei Zhen
(74) Attorney, Agent, or Firm—Blakely, Sokoloff, Taylor & Zafman LLP

(57) ABSTRACT

A method and apparatus for a atomic operation is described. A method comprises receiving a first program unit in a parallel computing environment, the first program unit including a memory update operation to be performed atomically, the memory update operation having an operand, the operand being of a data-type and of a data size, and translating the first program unit into a second program unit, the second program unit to associate the memory update operation with a set of one or more low-level instructions upon determining that the data size of the operand is supported by the set of low-level instructions, the set of low-level instructions to ensure atomicity of the memory update operation.

29 Claims, 9 Drawing Sheets

METHOD AND APPARATUS FOR AN ATOMIC OPERATION IN A PARALLEL COMPUTING ENVIRONMENT

BACKGROUND OF THE INVENTION

1. Field of the Invention

The invention relates to the field of computer processing. More specifically, the invention relates to a method and apparatus of parallel computation.

2. Background of the Invention

Parallel computing of tasks achieves faster execution and/or enables the performance of complex tasks that single processor systems cannot perform. One paradigm for performing parallel computing is shared-memory programming. The OpenMP standard is an agreed upon industry standard for programming shared-memory architectures.

OpenMP provides for synchronization constructs. One of these constructs ensures that memory locations are updated atomically: the ATOMIC construct. An atomic update operation is a sequence of operations or instructions that are non-interruptible to update a memory location. Atomically updating a shared memory location prevents multiple threads of a team from performing the same operation and/or destroying work done by another thread.

Although OpenMP outlines requirements for constructs and provides guidelines for parallel programming, details for implementing the ATOMIC construct are not provided. One method for atomically updating a shared memory location is to acquire locks on the memory location in order to limit modification of the shared memory location to the lock holder. Although this method ensures atomic updating of the memory location, the updating thread reduces performance with the acquisition and release of locks on the memory location. In addition, performance is reduced since other threads of the updating thread's team must wait to update the memory location until the lock on the memory location is released.

Another method to atomically update a memory location that achieves optimal performance is to create platform specific low-level instructions to perform the update. Although vendors can optimize their system with such low-level instructions, the cost to produce the low-level instructions can become a combinatorial explosion. To support such an implementation, vendors would create a number of low-level instructions proportional to the product of the number of data-types, the number of sizes of data-types, and the number of operations to be supported by a single platform. Hence, the cost of creating low-level instructions to support atomic updates for numerous operations is prohibitive on a single platform. This prohibitive cost makes a multiple-platform implementation of atomic update operations, based solely on platform specific low-level instructions, infeasible.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Figure 1:
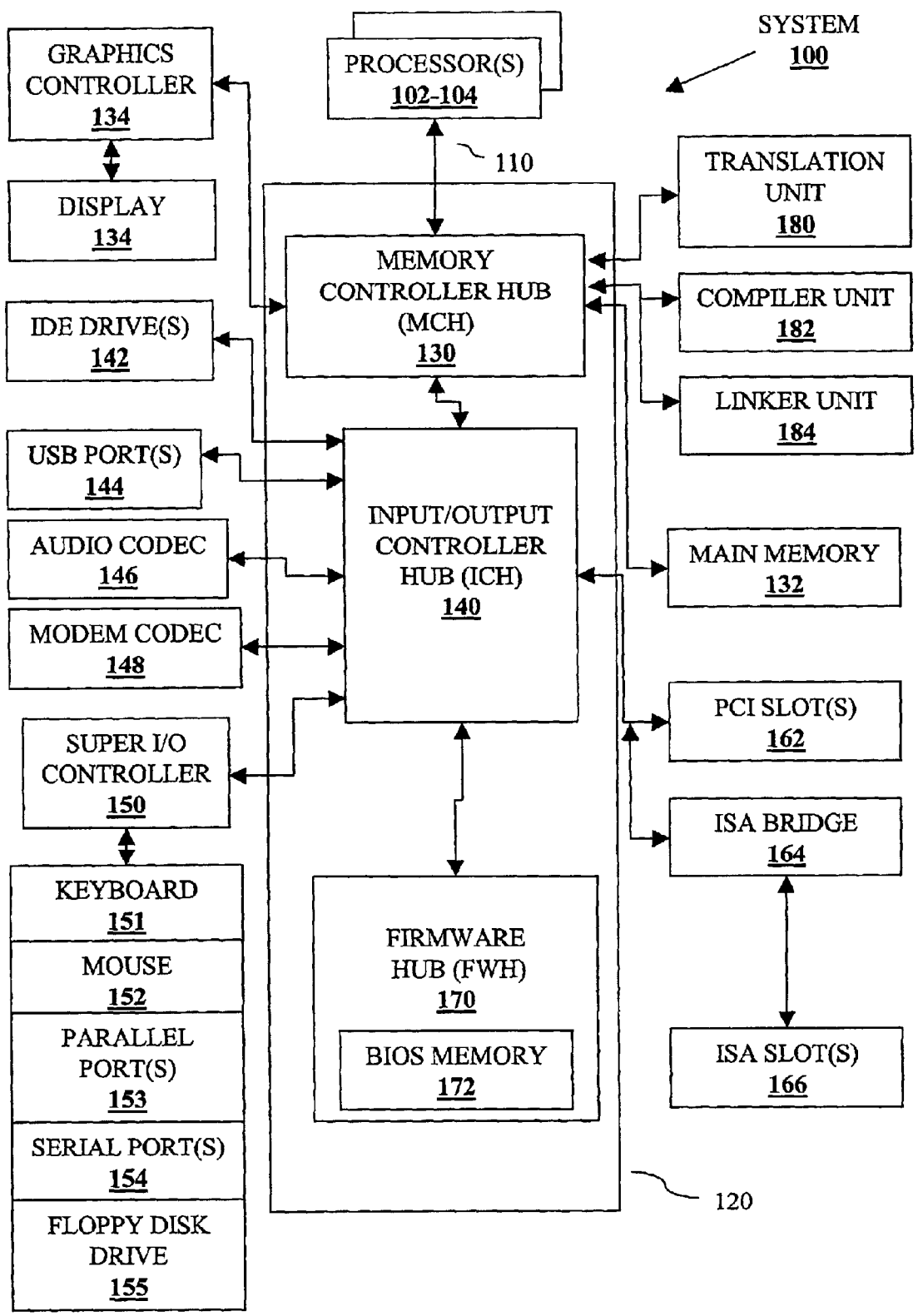
FIG. 1 illustrates an exemplary system 100 comprising processors 102 and 104 for translating atomic constructs, according to embodiments of the present invention.

FIG. 1 illustrates an exemplary system 100 comprising processors 102 and 104 for translating atomic constructs, according to embodiments of the present invention. Although described in the context of system 100, the present invention may be implemented in any suitable computer system comprising any suitable one or more integrated circuits.

As illustrated in FIG. 1, computer system 100 comprises processor 102 and processor 104. Computer system 100 also includes processor bus 110, and chipset 120. Processors 102 and 104 and chipset 120 are coupled to processor bus 110. Processors 102 and 104 may each comprise any suitable processor architecture and for one embodiment comprise an Intel® Architecture used, for example, in the Pentium® family of processors available from Intel® Corporation of Santa Clara, Calif. Computer system 100 for other embodiments may comprise one, three, or more processors any of which may execute a set of instructions that are in accordance with embodiments of the present invention.

Chipset 120 for one embodiment comprises memory controller hub (MCH) 130, input/output (I/O) controller hub (ICH) 140, and firmware hub (FWH) 170. MCH 130, ICH 140, and FWH 170 may each comprise any suitable circuitry and for one embodiment is each formed as a separate integrated circuit chip. Chipset 120 for other embodiments may comprise any suitable one or more integrated circuit devices.

MCH 130 may comprise any suitable interface controllers to provide for any suitable communication link to processor bus 110 and/or to any suitable device or component in communication with MCH 130. MCH 130 for one embodiment provides suitable arbitration, buffering, and coherency management for each interface.

MCH 130 is coupled to processor bus 110 and provides an interface to processors 102 and 104 over processor bus 110. Processor 102 and/or processor 104 may alternatively be combined with MCH 130 to form a single chip. MCH 130 for one embodiment also provides an interface to a main memory 132 and a graphics controller 134 each coupled to MCH 130. Main memory 132 stores data and/or instructions, for example, for computer system 100 and may comprise any suitable memory, such as a dynamic random access memory (DRAM) for example. Graphics controller 134 controls the display of information on a suitable display 136, such as a cathode ray tube (CRT) or liquid crystal display (LCD) for example, coupled to graphics controller 134. MCH 130 for one embodiment interfaces with graphics controller 134 through an accelerated graphics port (AGP). Graphics controller 134 for one embodiment may alternatively be combined with MCH 130 to form a single chip.

MCH 130 is also coupled to ICH 140 to provide access to ICH 140 through a hub interface. ICH 140 provides an interface to I/O devices or peripheral components for computer system 100. ICH 140 may comprise any suitable interface controllers to provide for any suitable communication link to MCH 130 and/or to any suitable device or component in communication with ICH 140. ICH 140 for one embodiment provides suitable arbitration and buffering for each interface.

For one embodiment, ICH 140 provides an interface to one or more suitable integrated drive electronics (IDE) drives 142, such as a hard disk drive (HDD) or compact disc read only memory (CD ROM) drive for example, to store data and/or instructions for example, one or more suitable universal serial bus (USB) devices through one or more USB ports 144, an audio coder/decoder (codec) 146, and a modem codec 148. ICH 140 for one embodiment also provides an interface through a super I/O controller 150 to a keyboard 151, a mouse 152, one or more suitable devices, such as a printer for example, through one or more parallel ports 153, one or more suitable devices through one or more serial ports 154, and a floppy disk drive 155. ICH 140 for one embodiment further provides an interface to one or more suitable peripheral component interconnect (PCI) devices coupled to ICH 140 through one or more PCI slots 162 on a PCI bus and an interface to one or more suitable industry standard architecture (ISA) devices coupled to ICH 140 by the PCI bus through an ISA bridge 164. ISA bridge 164 interfaces with one or more ISA devices through one or more ISA slots 166 on an ISA bus.

ICH 140 is also coupled to FWH 170 to provide an interface to FWH 170. FWH 170 may comprise any suitable interface controller to provide for any suitable communication link to ICH 140. FWH 170 for one embodiment may share at least a portion of the interface between ICH 140 and super I/O controller 150. FWH 170 comprises a basic input/output system (BIOS) memory 172 to store suitable system and/or video BIOS software. BIOS memory 172 may comprise any suitable non-volatile memory, such as a flash memory for example.

Additionally, computer system 100 includes translation unit 180, compiler unit 182 and linker unit 184. In an embodiment, translation unit 180, compiler unit 182 and linker unit 184 can be processes or tasks that can reside within main memory 132 and/or processors 102 and 104 and can be executed within processors 102 and 104. However, embodiments of the present invention are not so limited, as translation unit 180, compiler unit 182 and linker unit 184 can be different types of hardware (such as digital logic) executing the processing described herein (which is described in more detail below).

Accordingly, computer system 100 includes a machine-readable medium on which is stored a set of instructions (i.e., software) embodying any one, or all, of the methodologies to be described below. For example, software can reside, completely or at least partially, within main memory 132 and/or within processors 102/104. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Figure 2:
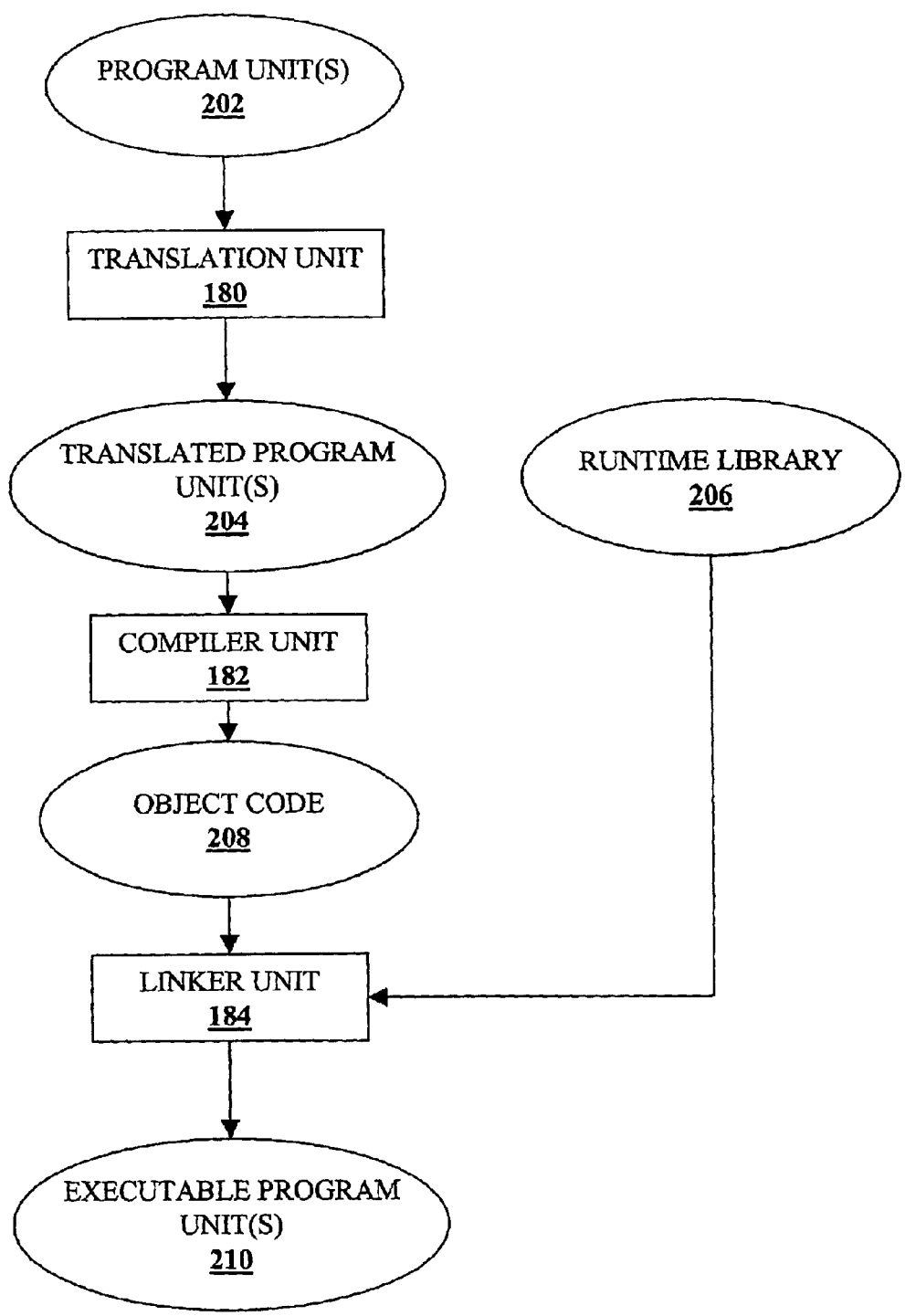
FIG. 2 illustrates a data flow diagram for generation of a number of executable program units that include instances of an atomic operation according to one embodiment of the invention.

FIG. 2 illustrates a data flow diagram for generation of a number of executable program units that include instances of a atomic operation according to one embodiment of the invention. As shown, program unit(s) 202 is input into translation unit 180. In an embodiment, there can be one to a number of such program units input into translation unit 180. Examples of a program unit include a program or a module, subroutine or function within a given program. In one embodiment, program unit(s) 202 are source code. The types of source code may include, but are not limited to, C, C++, Fortran, Java, Pascal, etc. However, embodiments of the present invention are not limited to program unit(s) 202 being written at the source code level. In other embodiments, such units can be at other levels, such as assembly code. Moreover, executable program unit(s) 210 that are output from linker unit 184 (which is described in more detail below) can be executed in a multi-processor parallel computing environment.

In an embodiment, translation unit 180 performs a source-to-source code level transformation of program unit(s) 202 to generate translated program unit(s) 204. However, embodiments of the present invention are not so limited. For example, in another embodiment, translation unit 180 could perform a source-to-assembly code level or source-to-object code level transformation of program unit(s) 202.

Compiler unit 182 receives translated program units 204 and generates object code 208. Compiler unit 182 can be different compilers for different operating systems and/or different hardware. In an embodiment, the compilation of translated program unit(s) 204 is based on the OpenMP standard.

Linker unit 184 receives object code 208 and runtime library 206 and generates executable code 210. Runtime library 206 can include one to a number of different functions or routines that are incorporated into the object code 208. In one embodiment, executable code 210 that is output from linker unit 184 can be executed in a multi-processor parallel computing environment. Additionally, executable program unit(s) 210 can be executed across a number of different operating system platforms, including, but not limited to, different versions of UNIX, Microsoft Windows™, real time operating systems such as VxWorks™, etc.

Figure 3:
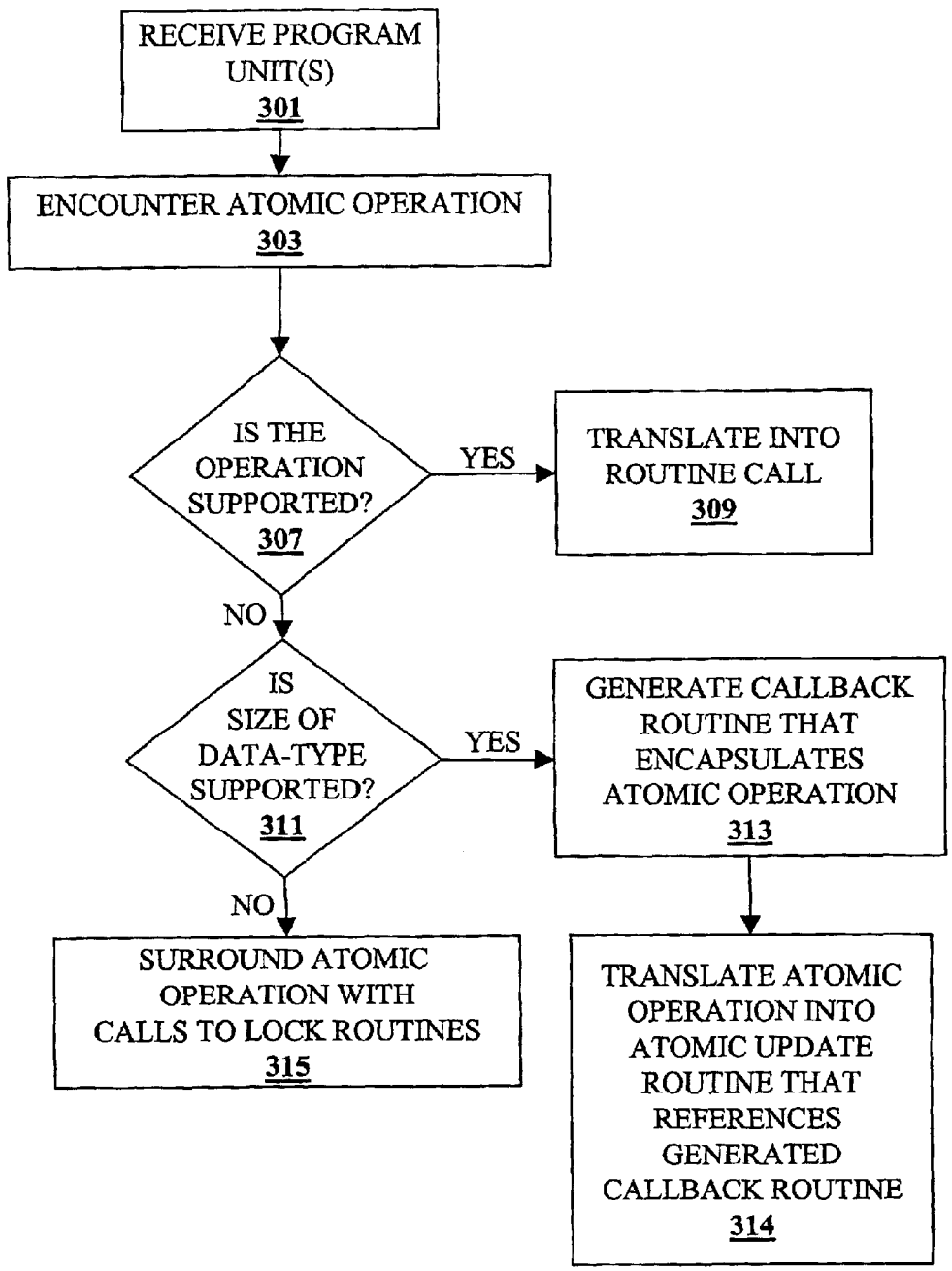
FIG. 3 is a flow chart for translating an atomic operation according to one embodiment of the invention.

FIG. 3 is a flow chart for translating an atomic operation according to one embodiment of the invention. An atomic operation protects against races when updating a shared memory location. At block 301, the translation unit 180 receives a program unit(s). At block 303, the translation unit 180 encounters an atomic operation. At block 307, the translation unit 180 determines if the atomic operation is supported by a low-level instruction. If the atomic operation is supported by a low-level instruction(s), then at block 309 the translation unit 180 translates the atomic operation into an implementation of the low-level instruction(s). For example, the low-level instruction(s) may be implemented as a routine in the runtime library 206.

The reference at block 307 to determining if an operation is supported by a low-level instruction refers to determining if a low-level instruction(s) can perform the operator on the data-type(s) and data size(s) corresponding to the atomic operation. For example, assume the operation is an addition of two 4-byte integers. This operation is supported if a low-level instruction(s) (e.g., a processor instruction(s) in assembly code) that can atomically perform an addition of 4-byte integers (for example, a 4-byte fetch-and-add instruction) resides on the system 100.

If the atomic operation is not supported by a low-level instruction(s), then at block 311 the translation unit 180 determines if the size of the data-type being updated by the atomic operation is supported by a low-level instruction(s) that ensures atomicity. If the size of the data-type is supported by such an instruction(s), then at block 313, the translation unit 180 generates a callback routine that encapsulates the atomic operation. At block 314, the translation unit 180 translates the atomic operation by replacing it with a call to an atomic update routine in runtime library 206. The call to the atomic update routine has the address of the callback routine described at block 314 as one of the atomic update routine's arguments. The atomic update routine causes the memory update operation to be performed atomically by enclosing a call to the callback routine with an implementation of the low-level instruction(s) that ensures atomicity. Such instructions can include a compare-and-swap (CAS) instruction, a test-and-set (TAS) instruction, etc.

If the translation unit 180 determines at block 311 that the size of the data-type corresponding to the atomic operation is not supported by such a low-level instruction(s), then the translation unit 180 surrounds the atomic operation with calls to lock routines (e.g., a call to a lock acquisition routine and a call to a lock release routine) in the runtime library 206.

In one embodiment of the invention, the translation unit 180 replaces the atomic operation with a call to a routine or function. In various embodiments of the invention, the translation unit 180 inlines instructions instead of inserting a call to a routine, generates assembly code instead of source code, etc.

In an alternative embodiment of the invention, the compiler unit 182 generates intermediate code for the atomic operation.

Figure 4:
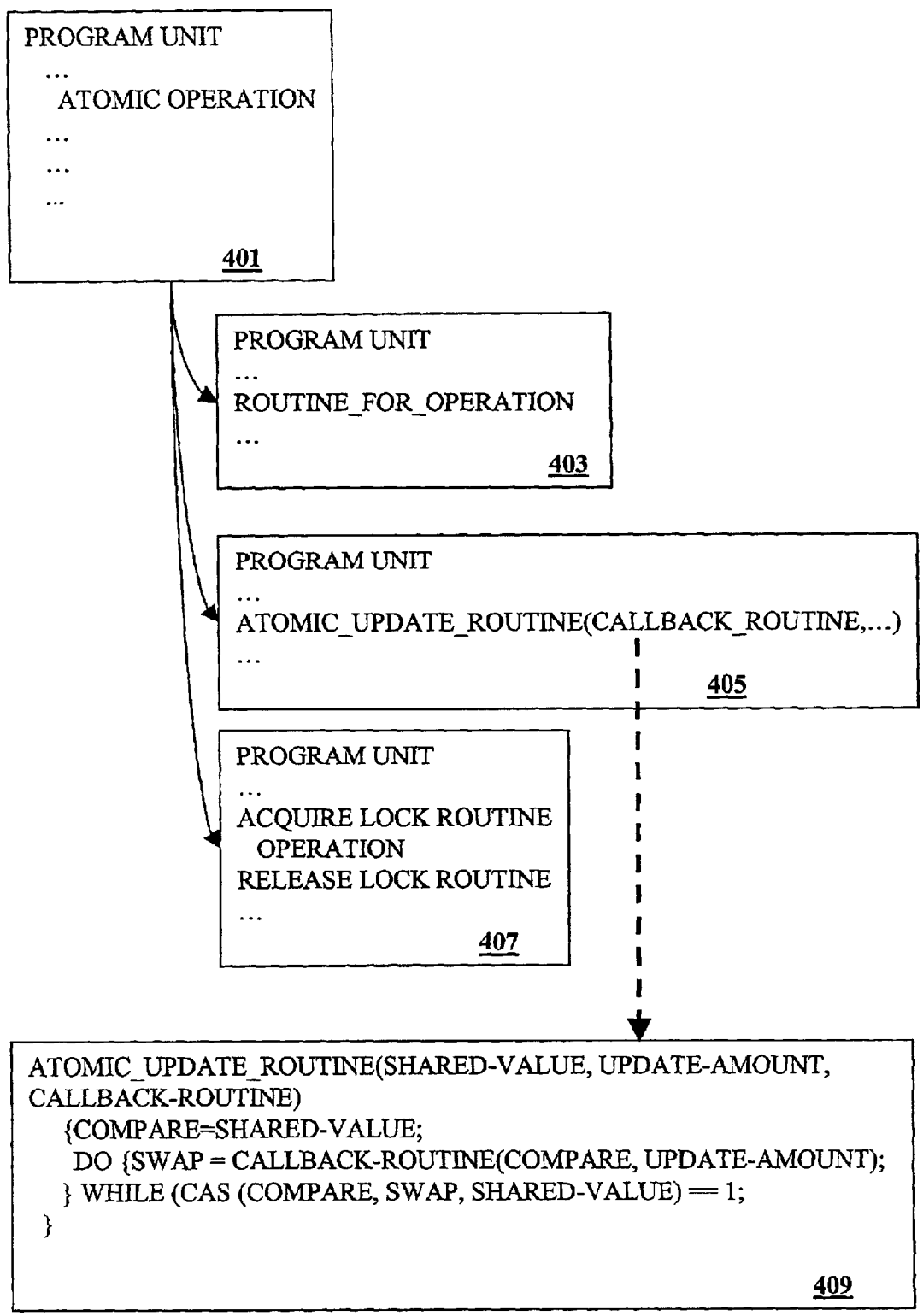
FIG. 4 is a diagram illustrating a program unit being translated into a second program unit according to one embodiment of the invention.

FIG. 4 is a diagram illustrating a program unit being translated into a second program unit according to one embodiment of the invention. FIG. 4 will be described with reference to FIG. 3. In FIG. 4, a program unit 401 includes an atomic operation. Program units 403, 405, and 407 are examples of possible translations of the program unit 401. An example of the atomic operation illustrated in the program unit 401 can have the following form:

shared-value=memory-update-operation(shared-value, update-amount);

The program unit 403 is an example translation of the program unit 401 in accordance with block 309 in FIG. 3. The program unit 403 includes a call to a routine that implements a low-level instruction(s) that supports the atomic operation indicated in the program unit 401. For example, if the update-amount in the exemplary atomic operation shown above is "1", then the ROUTINE_FOR_OPERATION may take the form of an atomic fetch-and-add of the shared-value by 1. Another example form of the ROUTINE_FOR_OPERATION could be a "LOCK add shared-value, update-amount" bus lock add instruction.

The program unit 405 is an example translation of the program unit 401 in accordance with blocks 313 and 314 of FIG. 3. The program unit 405 includes an atomic update routine as described in block 314. The atomic update routine call in the program unit 405 can have the following exemplary form:

atomic-update-routine(shared-value, update-amount, callback-routine);

A program unit 409 is an example of the atomic-update-routine called in the program unit 405. The atomic update routine illustrated in the program unit 409 includes a callback routine as described in block 313 of FIG. 3. An example of the callback routine can be the following:

callback-routine(shared-value, update-amount)
{new-shared-value=memory-update-operation(shared-value, update-amount); return(new-shared-value);}

The callback routine encapsulates the memory update operation so that it can be called from the atomic update routine.

The implementation of the atomic update routine illustrated in the program unit 409 utilizes a CAS instruction to ensure atomicity of the atomic operation. The CAS instruction can be defined as follows:

CAS (compare, swap, lock)
{if (compare==lock) then {lock=swap; return 0;} else {compare=lock; return 1;}}

Various embodiments of the described invention can be implemented with other low-level instructions to ensure atomicity.

The program unit 407 is an example translation of the program unit 401 in accordance with block 315 of FIG. 3. The program unit 407 includes a call to a lock-acquire routine and a call to a lock-release routine that surround the memory update operation. The lock routines in the program unit 407 are used to lock the shared memory location in order to update it with the result of the memory update operation. Locking the shared memory location prevents the shared memory location from being modified by a second thread while the memory update operation is being performed by a first thread. The lock routines can be optimized for portability by implementing separate lock routines for each supported platform with low-level instruction(s). The low-level instruction(s) can be fetch-and-add, bus lock instructions, TAS, etc. An alternative embodiment of the invention may implement platform independent lock routines with higher level instructions.

Figure 5:
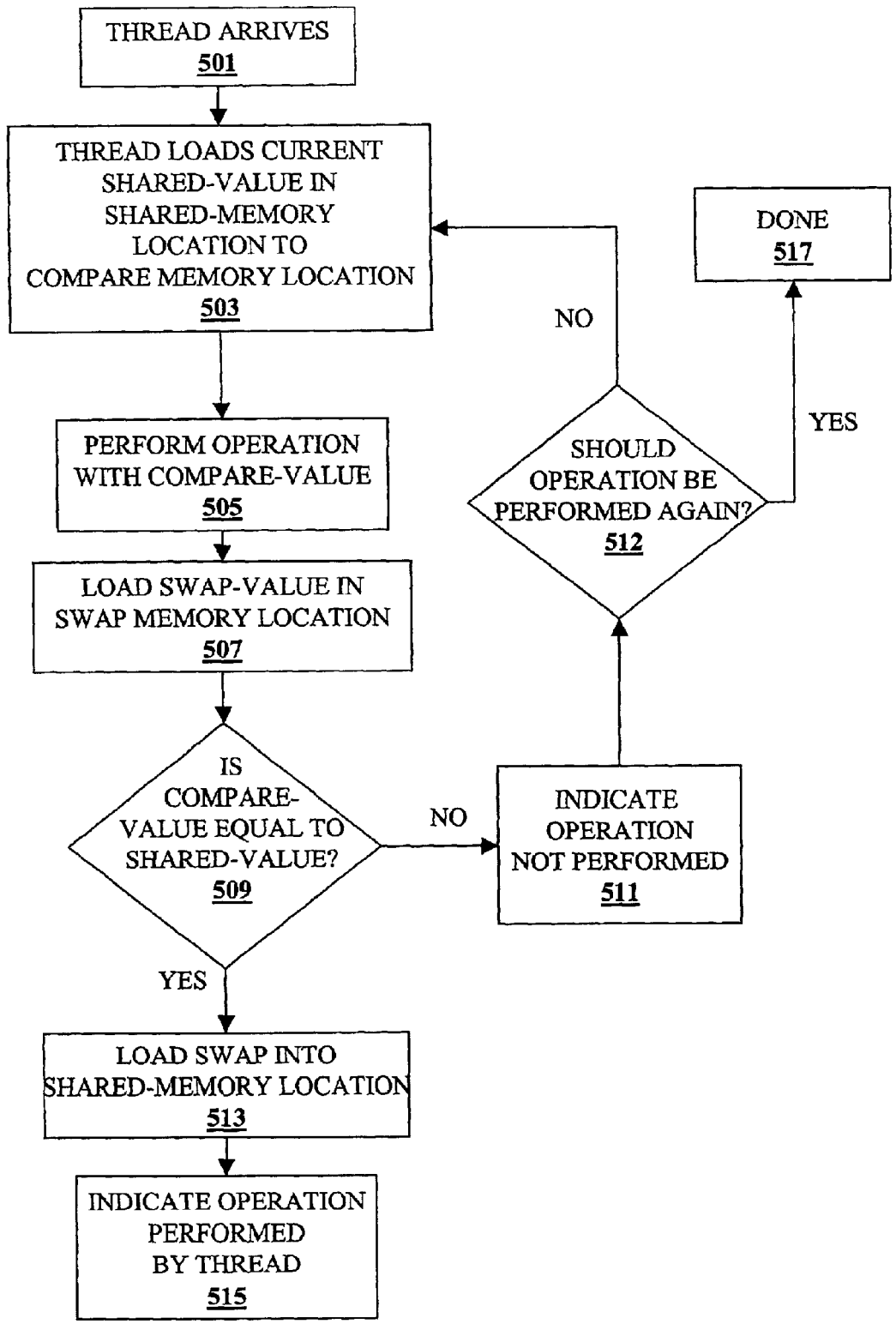
FIG. 5 is a flow chart for performing the translated program unit 405 according to one embodiment of the invention.

FIG. 5 is a flow chart for performing the translated program unit 409 according to one embodiment of the invention. FIGS. 6A–6D are diagrams illustrating threads performing the program unit 409 according to one embodiment of the invention. FIG. 5 will be described with reference to FIGS. 6A–6D and FIG. 4. At block 501, a thread of a team arrives at the ATOMIC_UPDATE_ROUTINE of the program unit 405. At block 503, the thread loads the shared-value from a shared memory location to be updated into a memory location that has been allocated to the thread ("compare memory location").

Figure 6A:
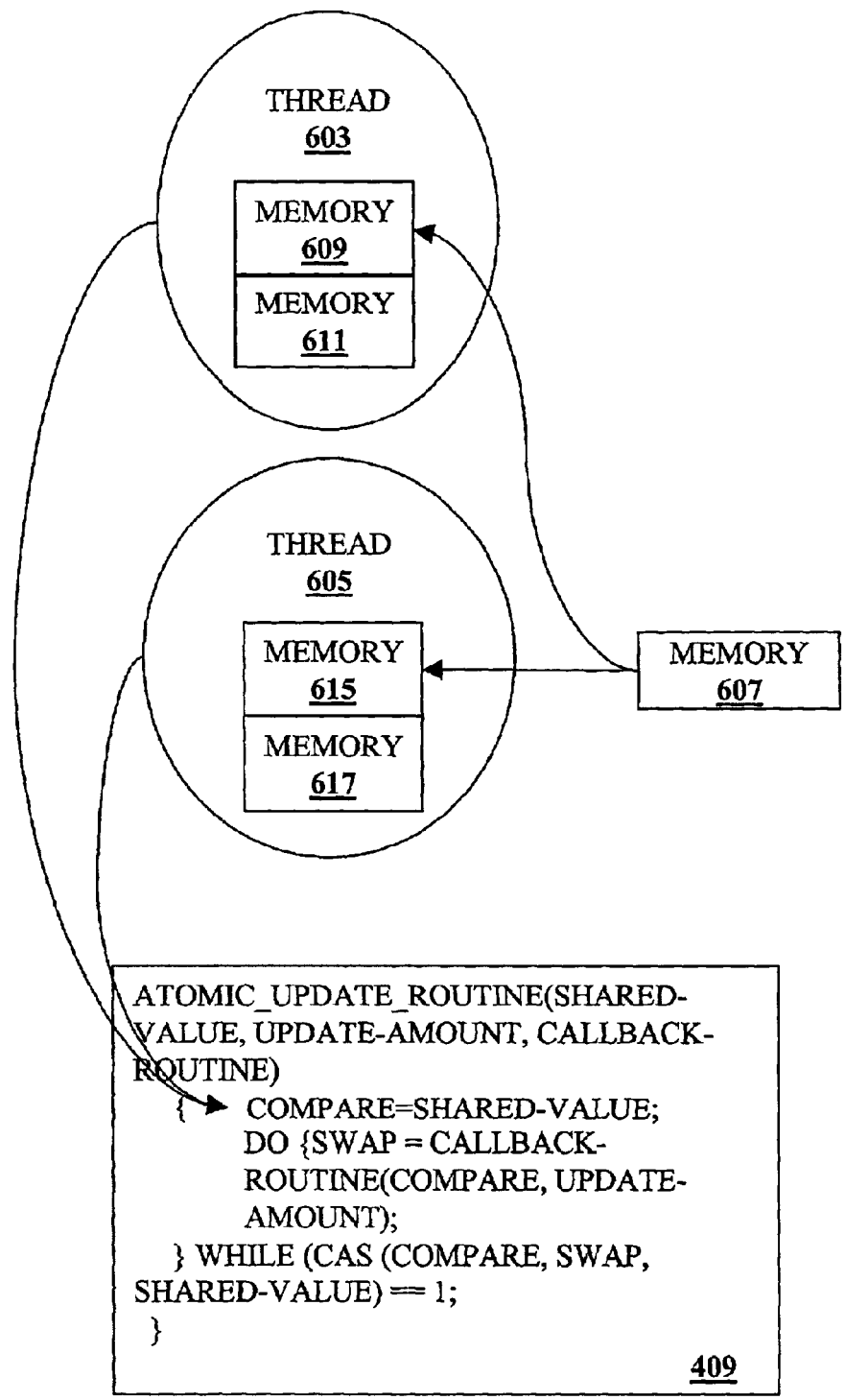
FIG. 6A is a diagram illustrating threads encountering the WRAPPER_FXN of the program unit 405 of FIG. 4 according to one embodiment of the invention.

FIG. 6A is a diagram illustrating threads performing the first line of the atomic update routine in the program unit 409 of FIG. 4 according to one embodiment of the invention. In FIG. 6A, threads 603 and 605 arrive at the following line of the example ATOMIC_UPDATE_ROUTINE:

compare=shared-value;

In accordance with this line, the thread 603 loads the shared-value of a shared memory location 607 into a memory location 609 allocated to the thread 603. Also in response to this line, the thread 605 loads the shared-value of the shared memory location 607 into a memory location 615 that has been allocated to the thread 605.

Figure 6B:
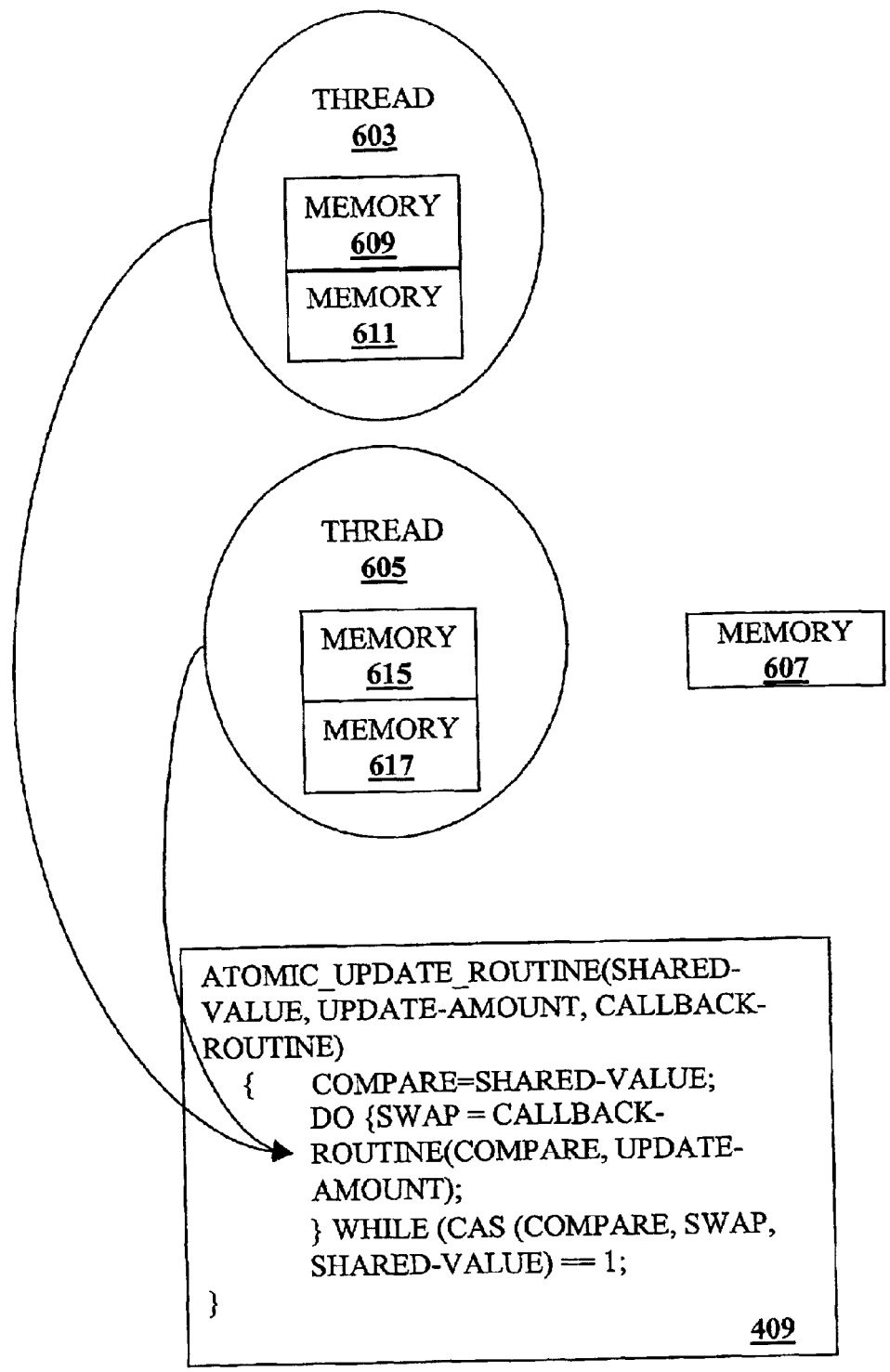
FIG. 6B is a diagram illustrating the thread 603 performing an exemplary operation of the program unit 405 according to one embodiment of the invention.

Returning to FIG. 5 at block 505, the thread performs the memory update operation with the compare-value. At block 507, the thread loads the result of the memory update operation into a second memory location that is allocated to the thread ("swap memory location") in accordance with the following line of the program unit 409:

swap=callback-routine (compare, update-amount);

FIG. 6B is a diagram illustrating the threads 603 and 605 arriving at the callback routine in the program unit 409 according to one embodiment of the invention. In FIG. 6B, the threads 603 and 605 arrive at the callback routine of the program unit 409. Both threads 603 and 605 perform a callback routine, such as the previous example of a callback routine. The threads 603 and 605 assign the result of the memory update operation to a new shared-value and load the new shared value into memory locations 611 and 617, respectively.

Returning to FIG. 5 at block 509, the thread determines if the shared-value in the shared memory location is equal to the compare value loaded into the compare memory location. If these values are not equal, then at block 511 the thread indicates that the atomic operation has not been performed (e.g., sets an execute bit to false). At block 512, it is determined if the atomic operation is to be attempted again. If the thread is not to attempt the atomic operation again, then at block 517 the thread is done. If the thread is to attempt the atomic operation again, then control flows from block 512 to block 503. If at block 509 the compare value and the shared-value are equal, then the shared-value has not been modified and the thread loads the swap value from the swap memory location into the shared memory location at block 513. At block 515 the thread indicates that it has performed the atomic operation (e.g., sets an execution bit to true).

Figure 6C:
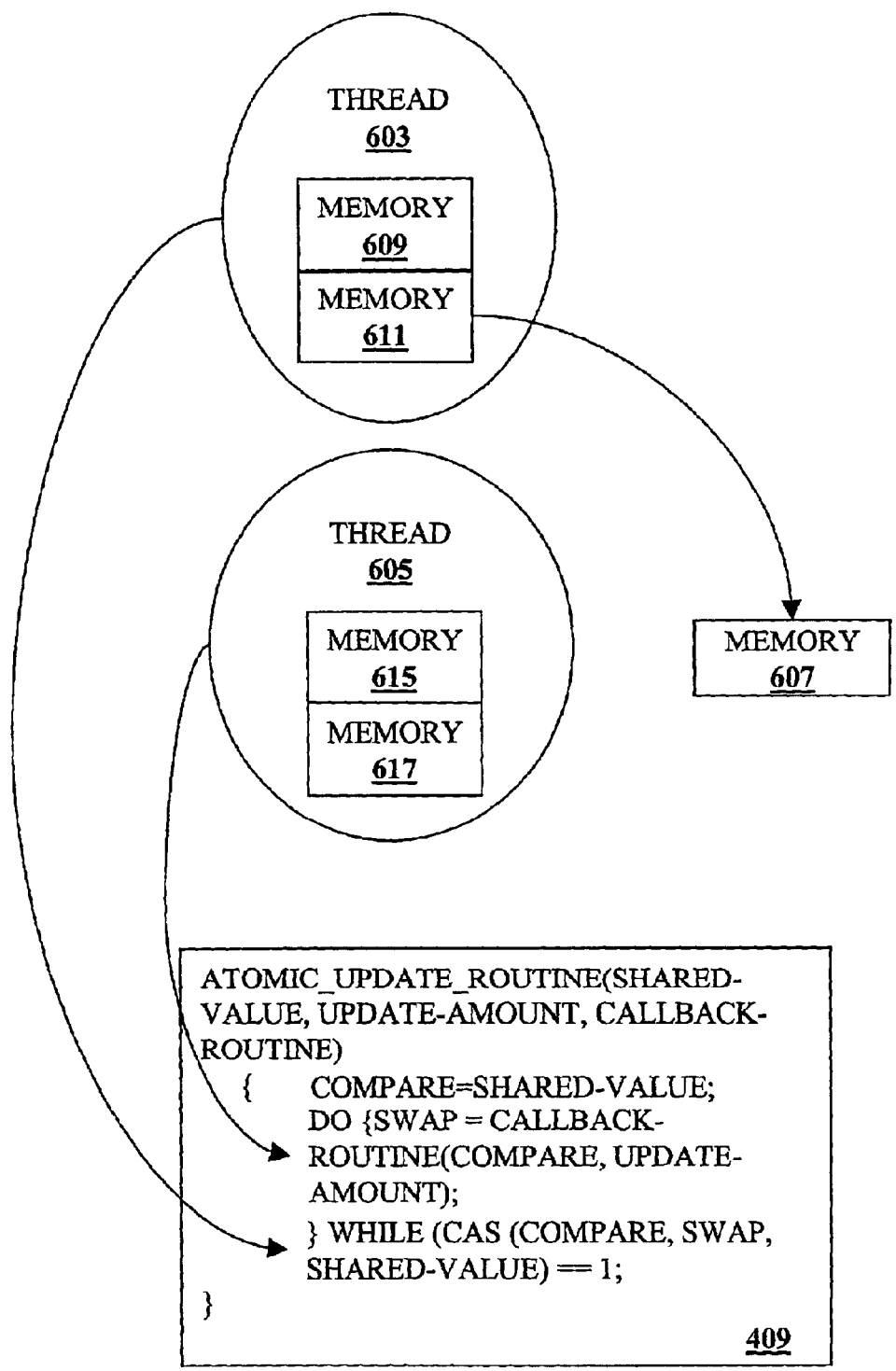
FIG. 6C is a diagram illustrating the thread 603 determining atomicity of the memory update operation according to one embodiment of the invention.

FIG. 6C is a diagram illustrating the thread 603 updating the shared memory location 607 according to one embodiment of the invention. In FIG. 6C, the thread 605 performs the CAS instruction of the program unit 409 to ensure atomicity of the memory update operation. In accordance with the example of the CAS instruction described above, the thread 603 determines if the shared-value in the shared memory location 607 is equal to the compare value in the memory location 609. If the values are equal, then atomicity for the memory update operation has not been violated and the thread 603 loads the swap value from the memory location 611 into the shared memory location 607. When the thread 605 performs the exemplary CAS instruction of the program unit 409, the shared-value and the compare value are not equal because the thread 603 has updated the shared memory location 607 with the thread's 603 swap value. Hence, the thread 605 determines that atomicity has been violated from its perspective (assuming that the thread's 603 swap value is different than the shared-value originally stored in the shared memory location 607).

Figure 6D:
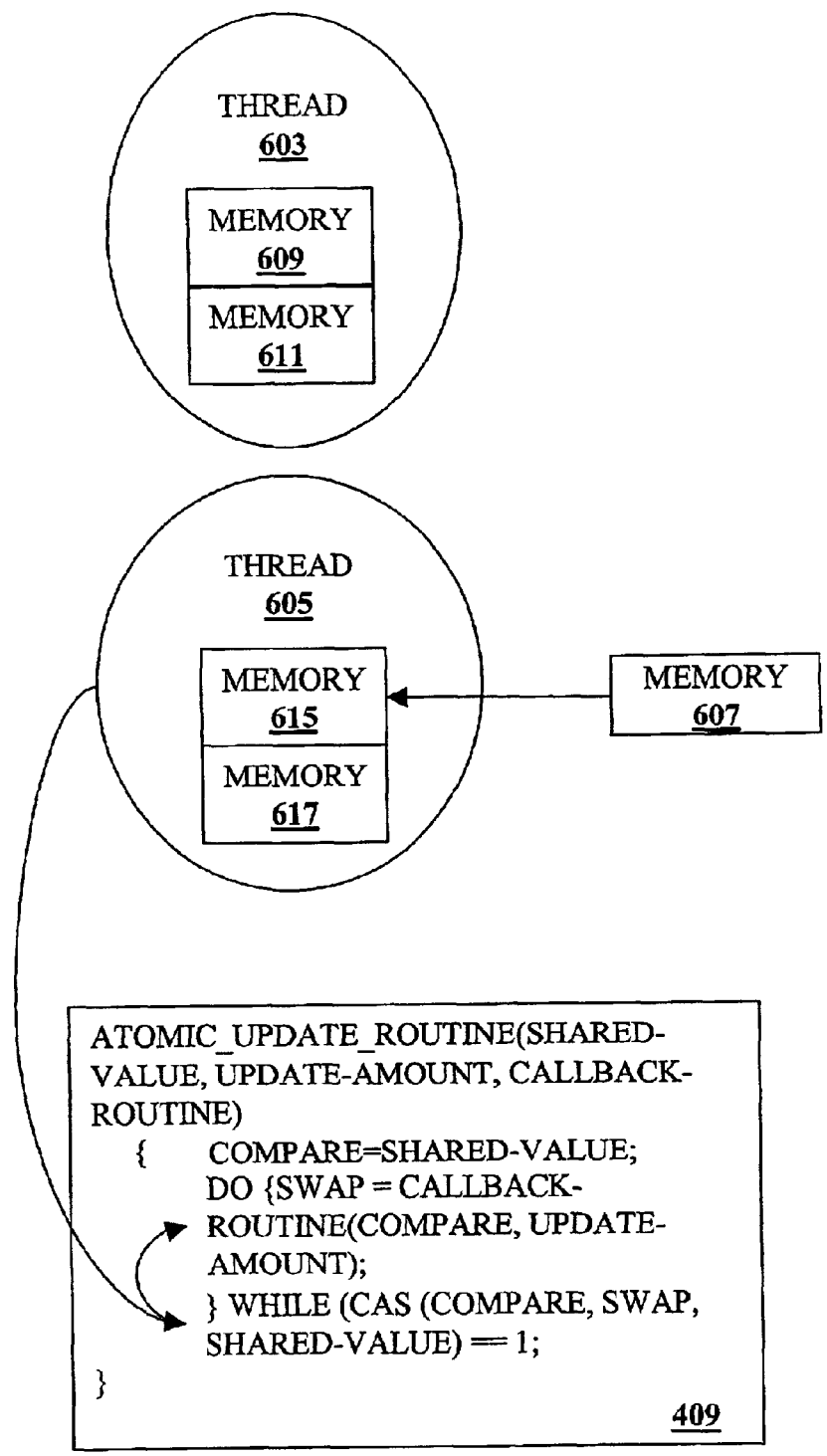
FIG. 6D is a diagram illustrating the thread 605 performing the loop of the program unit 409 according to one embodiment of the invention.

FIG. 6D is a diagram illustrating the thread 605 performing the loop of the program unit 409 according to one embodiment of the invention. Since atomicity has not been preserved for the thread 605, the thread 605 loads the shared-value, which is the thread's 603 swap value, from the shared-memory location 607 into the memory location 615. The thread 605 will perform the callback routine again to determine its swap value and store the swap value into the memory location 617. The thread 605 will repeat this loop until the thread 605 is terminated or the thread 605 successfully performs the memory update operation atomically.

The present embodiments of the invention provide efficient, scalable, parallel atomic operations. A single instantiation of the present embodiments of the invention can implement efficient atomic operations across multiple platforms (i.e., variants of hardware architecture, operating system, threading environment, compilers and programming tools, utility software, etc.) and yet optimize performance for each individual platform. Furthermore, the present embodiments of the invention provide the ability to tailor performance and explore performance/implementation-cost trade-offs on each of multiple platforms. For example, low-level instruction sets (i.e., assembly code instructions) may be developed to support specified operators, data-types, and/or data-type sizes at a reasonable cost while still providing the ability to optimize other operators, data-types, and/or data-type sizes differently with the described embodiments of the present invention. The present embodiments of the invention provide for using low-level instruction sets to fully support a spectrum of operations, data-types, and data-type sizes on an individual platform in order to optimize performance on that platform, while still providing the ability to optimize performance separately on other platforms.

While the invention has been described in terms of several embodiments, those skilled in the art will recognize that the invention is not limited to the embodiments described. In various embodiments of the invention, program units are translated from source code to source code or from source code to object code or assembly language. In alternative embodiments of the invention, an interpreter interprets program units, code is inlined instead of making calls to a runtime library, etc.

Furthermore, the atomic update to a shared memory location can be performed by a thread as described, processor, operating system process, etc.

The method and apparatus of the invention can be practiced with modification and alteration within the spirit and scope of the appended claims. Embodiments of the invention are described with reference to an atomic operation. The form of an atomic operation depends on the implementing language. For example, an atomic operation may take the form of a directive and a memory update operation, a call to a single function defined as an atomic operation, etc. The description is thus to be regarded as illustrative instead of limiting on the invention.

What is claimed is:

1. A method comprising:

receiving a first program unit in a parallel computing environment, the first program unit including a memory update operation to be performed atomically, the memory update operation having an operand, the operand being of a data-type and of a data size; and translating the first program unit into a second program unit, the second program unit to associate the memory update operation with a set of one or more low-level instructions upon determining that the data size of the operand is supported by the set of low-level instructions, the set of low-level instructions to ensure atomicity of the memory update operation.

2. The method of claim 1 wherein to associate the memory update operation with the set of low-level instructions comprises:

enclosing the memory update operation in a callback routine; and referencing the callback routine from a routine that references the set of low-level instructions.

3. The method of claim 1 wherein the set of low-level instructions encapsulate the memory update operation.

4. The method of claim 1 further comprising translating the first program unit into a third program unit upon determining that a second set of one or more low-level instructions support the memory update operation for the data-type and the data size of the operand, the second set of low-level instructions for performing the memory update operation atomically.

5. The method of claim 1 further comprising translating the first program unit into a third program unit upon determining that a second set of low-level instructions does not support the memory update operation for the data-type and the data size of the operand and that the set of low-level instructions does not support the data size of the operand, the third program unit to associate the memory update operation with a set of locking instructions.

6. The method of claim 1 wherein the set of low-level instructions for ensuring atomicity is a compare-and-swap instruction.

7. A method comprising:
receiving a first program unit, the first program unit including a memory update operation to be performed atomically, the memory update operation indicating an operand and an operator, the operand being of a data-type and a data size;
translating the first program unit into a second program unit upon determining that a first set of one or more low-level instructions support the memory update operation for the data-type and the data size of the operand, the first set of low-level instructions for performing the memory update operation atomically;
translating the first program unit into a third program unit, the third program unit to associate the memory update operation with a second set of one or more low-level instructions upon determining that the data size of the operand is supported by the second set of low-level instructions, the second set of low-level instructions to ensure atomicity of the memory update operation; and
translating the first program unit into a fourth program unit upon determining that the first set of low-level instructions does not support the memory update operation for the data-type and the data size of the operand and that the second set of low-level instructions does not support the data size of the operand, the fourth program unit to associate the memory update operation with a set of locking instructions.

8. The method of claim 7 wherein the second set of low-level instructions encapsulate the memory update operation.

9. The method of claim 7 wherein associating the second set of instructions to the memory update operation comprises:
enclosing the memory update operation in a callback routine; and
referencing the callback routine from a routine that references the second set of low-level instructions.

10. The method of claim 7 wherein the second set of low-level instructions is a compare-and-swap instruction.

11. The method of claim 7 wherein the second set of low-level instructions is a test-and-set instruction.

12. An apparatus comprising:
a memory including a shared memory location;
a translation unit coupled with the memory, the translation unit to translate a first program unit including a memory update operation to be performed atomically into a second program unit upon determining that a set of one or more low-level instructions support a data size for the memory update operation, the second program unit to associate the set of low-level instructions with the memory update operation, the set of low-level instructions to ensure atomicity of the memory update operation;
a compiler unit coupled with the translation unit and the shared-memory, the compiler unit to compile the second program unit; and
a linker unit coupled with the compiler unit and the shared-memory, the linker unit to link the compiled second program unit with a library.

13. The apparatus of claim 12 wherein the second program unit to associate the set of low-level instructions with the memory update operation comprises encapsulating the memory update operation.

14. The apparatus of claim 12 further comprising a set of one or more processors to host a plurality of threads, the plurality of threads to execute the second program unit.

15. The apparatus of claim 12 wherein the second program unit to associate the set of low-level instructions with the memory update operation comprises the translation unit to generate a callback routine enclosing the memory update operation and the translation unit to encapsulate the callback routine with a routine for the set of low-level instructions.

16. A system comprising:
a memory including a shared memory location;
a translation unit coupled with the shared-memory, the translation unit to translate a first program unit including a memory update operation to be performed atomically into a second program unit upon determining that a set of one or more low-level instructions support a data size for the memory update operation, the second program unit to associate the set of low-level instructions with the memory update operation, the set of low-level instructions to ensure atomicity of the memory update operation;
a compiler unit coupled with the translation unit and the shared-memory, the compiler unit to compile the second program unit; and
a set of one or more processors coupled with the shared-memory, the translation unit, and the compiler unit, the set of processors to host a plurality of threads, the plurality of threads to perform the memory update operation in accordance with the set of low-level instructions.

17. The system of claim 16 wherein the second program unit to associate the set of low-level instructions with the memory update operation comprises encapsulating the memory update operation.

18. The system of claim 16 wherein each of the set of processors comprise:
a first register coupled with the shared-memory, the first register to host a first value loaded by one of the plurality of threads from the shared memory location; and
a second register coupled with the shared-memory, the second register to host a result of generated by the one of the plurality of threads executing the memory update operation.

19. The system of claim 16 wherein the second program unit to associate the set of low-level instructions with the memory update operation comprises the translation unit to generate a callback routine enclosing the memory update operation and the translation unit to encapsulate the callback routine with a routine for the set of low-level instructions.

20. A machine-readable medium that provides instructions, which when executed by a set of one or more processors, cause said set of processors to perform operations comprising:

receiving a first program unit in a parallel computing environment, the first program unit including a memory update operation to be performed atomically, the memory update operation having an operand, the operand being of a data-type and of a data size; and translating the first program unit into a second program unit, the second program unit to associate the memory update operation with a set of one or more low-level instructions upon determining that the data size of the operand is supported by the set of low-level instructions, the set of low-level instructions to ensure atomicity of the memory update operation.

21. The machine-readable medium of claim 20 wherein the set of low-level instructions encapsulate the memory update operation.

22. The machine-readable medium of claim 20 further comprising translating the first program unit into a third program unit upon determining that a second set of one or more low-level instructions support the memory update operation for the data-type and the data size of the operand, the second set of low-level instructions for performing the memory update operation atomically.

23. The machine-readable medium of claim 20 further comprising translating the first program unit into a third program unit upon determining that a second set of low-level instructions does not support the memory update operation for the data-type and the data size of the operand and that the set of low-level instructions does not support the data size of the operand, the third program unit to associate the memory update operation with a set of locking instructions.

24. The machine-readable medium of claim 20 wherein the set of low-level instructions for ensuring atomicity is a compare-and-swap instruction.

25. A machine-readable medium that provides instructions, which when executed by a set of one or more processors, cause said set of processors to perform operations comprising:

receiving a first program unit, the first program unit including a memory update operation to be performed atomically, the memory update operation indicating an operand and an operator, the operand being of a data-type and a data size;

translating the first program unit into a second program unit upon determining that a first set of one or more low-level instructions support the memory update operation for the data-type and the data size of the operand, the first set of low-level instructions for performing the memory update operation atomically;

translating the first program unit into a third program unit, the third program unit to associate the memory update operation with a second set of one or more low-level instructions upon determining that the data size of the operand is supported by the second set of low-level instructions, the second set of low-level instructions to ensure atomicity of the memory update operation; and translating the first program unit into a fourth program unit upon determining that the first set of low-level instructions does not support the memory update operation for the data-type and the data size of the operand and that the second set of low-level instructions does not support the data size of the operand, the fourth program unit to associate the memory update operation with a set of locking instructions.

26. The machine-readable medium of claim 25 wherein the second set of low-level instructions encapsulate the memory update operation.

27. The machine-readable medium of claim 25 wherein associating the second set of instructions to the memory update operation comprises:

enclosing the memory update operation in a callback routine; and referencing the callback routine from a routine that references the second set of low-level instructions.

28. The machine-readable medium of claim 25 wherein the second set of low-level instructions is a compare-and-swap instruction.

29. The machine-readable medium of claim 25 wherein the second set of low-level instructions is a test-and-set instruction.

* * * * *